United States Patent [19]

Johnson

[11] Patent Number: 4,908,925

[45] Date of Patent: Mar. 20, 1990

[54] HEAVY DUTY AUTOMOTIVE WHEEL HUB PULLER

[76] Inventor: Rudolph E. Johnson, 11 Park Ave., Apt. 7-O, Mt. Vernon, N.Y. 10550

[21] Appl. No.: 209,336

[22] Filed: Jun. 15, 1988

[51] Int. Cl.[4] .................................... B23P 19/04

[52] U.S. Cl. .................................... 29/260; 29/244; 29/256; 29/270; 29/802

[58] Field of Search .................. 29/259, 260, 159.3, 29/802, 803, 270, 273, 244, 245, 256

[56] References Cited

U.S. PATENT DOCUMENTS

| | | | |
|---|---|---|---|
| 1,597,909 | 8/1926 | Livesay | 29/260 |
| 3,594,890 | 7/1971 | Cordell | 29/260 X |
| 3,696,496 | 10/1972 | Corder | 29/260 |
| 3,763,539 | 10/1973 | Dodd | 29/260 X |
| 4,583,288 | 4/1986 | Young | 29/260 X |

FOREIGN PATENT DOCUMENTS

| | | | |
|---|---|---|---|
| 1236430 | 3/1967 | Fed. Rep. of Germany | 29/260 |
| 800313 | 8/1958 | United Kingdom | 29/260 |
| 907046 | 10/1962 | United Kingdom | 29/260 |
| 2098914 | 12/1982 | United Kingdom | 29/260 |

*Primary Examiner*—Mark Rosenbaum
*Assistant Examiner*—Peter D. B. Vo
*Attorney, Agent, or Firm*—Lackenbach, Siegel, Marzullo & Aronson

[57] ABSTRACT

A heavy duty automotive wheel hub puller includes a plurality of support legs extended from a support bracket. These legs connect to the wheel hub lugs and the support bracket passes over the wheel hub. A pressure screw threaded through the support bracket is directed against the axle housing at the center of the wheel hub. Turning the screw into the axle housing exerts a force which causes the hub to drift off the axle housing. The support legs provide axes of rotation for the leg bases which engage the wheel hub lugs and the legs are selectively positionable longitudinally along the support bracket. A wide variety of hub configurations and diameters are accommodated by the subject invention. Attachment to two, or with an adapter to three lugs, is available as suits the wheel hub to be serviced.

14 Claims, 2 Drawing Sheets

HEAVY DUTY AUTOMOTIVE WHEEL HUB PULLER

BACKGROUND OF THE INVENTION

In servicing automotive vehicles, particularly large vehicles, it is difficult to remove the wheel hub from the axle housing. It is especially difficult to remove hubs which have suffered burnt bearings, as these bearings frequently weld themselves to the axle housing. Thus a problem exists with heavy duty trucks, bus and trailers where it is desirable to remove the wheel and hub as one assembly. In some situations, it is necessary to remove the wheel first and then operate directly on the hub to separate it from the axle housing. The problem is especially acute where, as stated, there are burnt bearings and on vehicles whose hubs have not been removed for a long period of time and whose bearings tend to cling to the axle housing.

What is needed is a simple and effective tool which can be used in heavy duty applications as a wheel hub puller.

SUMMARY OF THE INVENTION

Generally speaking, in accordance with the invention, a heavy duty automotive wheel hub puller, especially suitable in handling a variety of known wheel hubs, is provided. A plurality of support legs extend from a support bracket. These legs connect to the wheel hub lugs in such a manner that the support bracket passes over the center of the wheel hub. A pressure screw threaded through the support bracket is directed against the axle housing at the center of the wheel hub. Turning the screw into the axle housing exerts a force which causes the hub to drift off the axle housing.

The support legs provide an axis of rotation for the leg bases which engage the wheel hub lugs. The legs are positionable longitudinally along the support bracket. Thereby, most configurations of conventional wheel hubs allow the bases to attach symmetrically to the lugs with the center of the bracket over the center of the wheel hub. In this manner, a wide variety of hub configurations and diameters are accommodated by the subject invention. Attachment to either two or three lugs is available as suits the wheel hub to be serviced. Based on symmetry, it is apparent that four and six lugs can be attached in alternative embodiments of the invention using additional legs.

Accordingly, it is an object of this invention to provide an improved heavy duty automotive wheel hub puller which exerts a great and properly distributed force on a wheel hub relative to its axle housing.

Another object of this invention is provide an improved heavy duty automotive wheel hub puller which is readily adjustable for use with a wide variety of hub configurations and diameters.

A further object of this invention is to provide an improved heavy duty automotive wheel hub puller which is readily convertible for use with different types of wheel hubs.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

With reference to FIGS. 1–6, the heavy duty automotive wheel hub puller 10 of this invention, includes a pressure screw support bracket 12 which is formed of a rigid plate 14 of high strength, for example, steel, which is reinforced by bars 16. The bars 16 are integrally connected along the longitudinal edges of the plate 14, for example, by welding when steel is used for the plate 14 and reinforcing bars 16. Thus, the support bracket 12 is reinforced against longitudinal bending.

Figure 3:
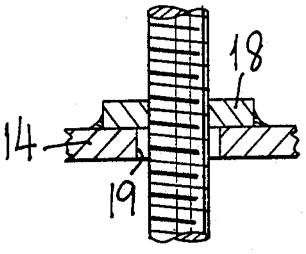
FIG. 3 is a sectional view taken along the line 3—3 of FIG. 2.

A boss 18 is fixedly connected to the upper surface of the plate 14. The boss 18 is internally threaded as best illustrated in FIG. 3, and may comprise a standard nut welded to the plate 14 in a construction of steel. The boss 18 is centered between the ends of the plate 14 over a bore 19 in the plate 14. Elongated slots 20 lie parallel to the longitudinal axis of the plate 14 and are positioned symmetrically on either side of the boss 18 and between the reinforcing bars 16.

A pair of support leg assemblies 22, 24 are positioned on both sides of the boss 18 and include respectively support rods 26 having mounting bases 28 fixedly connected at one end thereof. The mounting bases 28 are in the form of flat rectangular plates each having an oval slot 30 formed therethrough and oriented on the base 28 parallel to the longitudinal axis of the base. The support rod 26 is perpendicular to the general plane of the mounting base 28 and connected to the plate 28 so the longitudinal axis of the oval slot 30 passes through the center of the rod 26.

The rod 26 is circular in cross-section and threaded at least for that portion of its length where it passes through the elongated slot 20 in the support bracket 12. The diameter of the rod 26 allows for a firm but sliding fit in the slot 20. The support leg assemblies 22, 24 are identical and the description given above applies equally to both leg assemblies.

Figure 1:
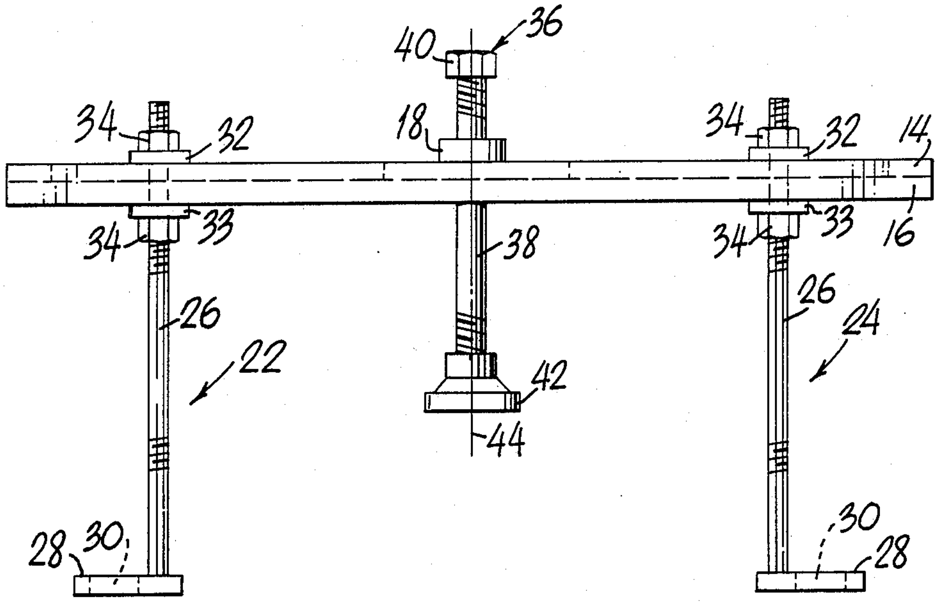
FIG. 1 is a side elevation of a heavy duty automotive wheel hub puller in accordance with the invention.
Figure 2:
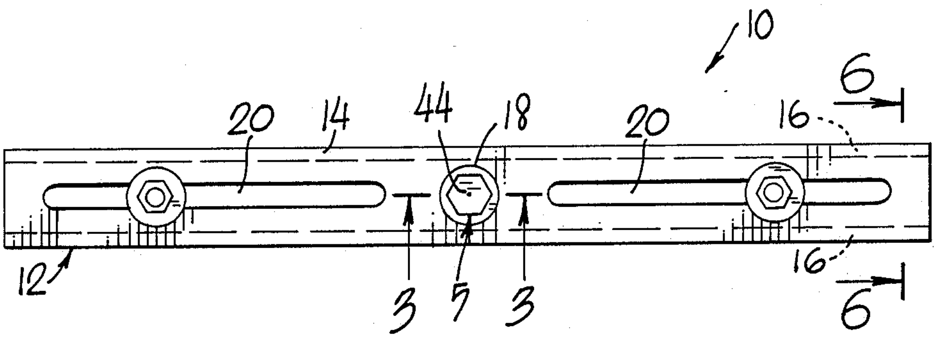
FIG. 2 is a top view of the heavy duty automotive wheel hub puller of FIG. 1.

The support leg assemblies 22, 24 are rigidly connected to the support bracket 12 by means of washers 32, 33 and nuts 34. When the nuts 34 are tightened down, the plate 14 is sandwiched between the washers 32, 33 to form a rigidized structure combining the support bracket 12 and the support leg assemblies 22, 14. It will be noted, that before tightening the nuts 34, it is possible to locate the leg assemblies 22, 24, respectively, anywhere along the associated longitudinal slot 20 and the mounting base 28 can extend radially from the rod 26 in any direction, around a 360 degree arc, as would be seen in a top view (FIG. 2).

A pressure screw assembly 36 comprises a threaded rod 38 which is in engagement with the internally threaded boss 18. A hex head knob 40 is formed at one end of the threaded rod 38 and a contact pad 42 is rotatably connected to the rod 38. The base 42 rotates about the longitudinal axis 44 of the threaded rod 38. The threaded rod 38 includes a transverse groove 46 formed in a outer surface thereof and the contact pad 42 includes a circular bore 48 for receiving the threaded rod 38 therein and a annular groove 50 which is in alignment with the groove 46 when the rod 38 is seated in the pad 42. A C-shaped snap ring 52 inter-engages the aligned grooves 46, 50 and prevents the threaded rod 38 from separating from the contact pad 42 after the components have been assembled in the known manner by compressing the snap ring 52 and telescoping the parts until the grooves 46, 50 align and the snap ring expands.

It will be apparent that by applying a turning force to the hex head knob 40, the pressure screw assembly 36 can be advanced and withdrawn in the longitudinal direction of the axis 44.

In an actual embodiment, the plate 14 is ½" thick steel 2½" wide and 20" long, with a 1" diameter, center opening 19. The slots 20 are ⅞" wide and 7" long and commence 1" from the ends of the plate 14. The reinforcer bars 16 are 20" long and ¾" square, welded to the underside of the plate 14, flush with its outer edges. A 15/16" Acme nut 18 is welded over the 1" opening 19.

The rods 26 are 12" long and are ⅞" NC threaded rod. The nuts 34 are ⅞" NC and the washers 32, 33 are ⅞" flat washers. The pressure screw assembly 36 is a 15/16" by 8½" long Acme screw with a 1¼" hex head. The lower 1" of the rod 38 is stepped down to 13/16". The groove 46 is ⅛" wide and ⅛" deep and is machined around the rod 38, 5/16" down on the stepped portion.

The pressure contact pad 42 is a bell-shaped disk 3½" in diameter at the face and 2" across the upper end. Height is 2". The bore 48 is ⅞" diameter by 1" deep, machined into the 2" diameter face of the base 42. The groove 50 is ⅛" wide by ⅛" deep, machined around the bore and located 5/16" down from the top surface 54.

The mounting bases 28 are ½" thick steel plate, 4" long by 2½" wide. A 49/64" hole, having its center ¾" from one end of the plate 28, is drilled and tapped for a ⅞" NC thread. The slot 30 is 1⅛" wide by 2½" long.

In use, the heavy duty automotive wheel hub puller of FIGS. 1–6 operates on a Budd wheel construction to remove the wheel hub from the axle as follows.

The axle shafts and bearing adjusting lock nuts are removed. Two lug nuts, opposite each other on the wheel hub, are removed, that is, two lug nuts on a common diameter of the hub. The wheel is positioned so that the two lugs are in a horizontal plane. The support rods are loosely positioned in the slots 20 and the bases 28 extend from opposite sides of the support bracket 12, such that the wheel hub lugs, with the nuts removed, are able to enter the grooves 30 in the bases 28. The mounting bases 28 are then connected to the wheel hub by replacement of the lug nuts.

The support bracket 12 is adjusted on the rods 26, such that the contact pad 42 is centered over the axle housing at the center of the wheel hub, and the nuts 34 and washers 32, 33 are tightened to rigidize the structure. Now the threaded rod 38 is rotated by the hex head knob 40, such that the contact pad 42 advances in the direction of the mounting bases 28. In the process, the wheel hub drifts off the axle housing.

In using the wheel hub puller in accordance with the invention with a six stud Dayton hub assembly, it is necessary to remove two lug nuts from the hub opposite each other, that is, on the same diameter through the center of the hub. The wheel is positioned so the two lugs are in a horizontal plane. The support rods 26 are rotated such that the mounting bases 28 extend outwardly from the support bracket 12. The lugs on the wheel hub pass through the oval slots 30 and the bases 28 are held in place by the lug nuts from the wheel hub which had previously been removed.

The remaining steps as outlined above are now followed to remove the hub from the axle housing.

It should be noted in both of the usages described above, the lugs lie on a common diameter passing through the center of the wheel hub, and two lugs are connected to bases 28. It should be apparent that in an alternative embodiment in accordance with the invention, the wheel hub puller may comprise a support bracket 12 having four arms extending as a cross at right angles to each other from the central axis 44, and four bases 28 associated with support-leg assemblies may be used.

Figure 7:
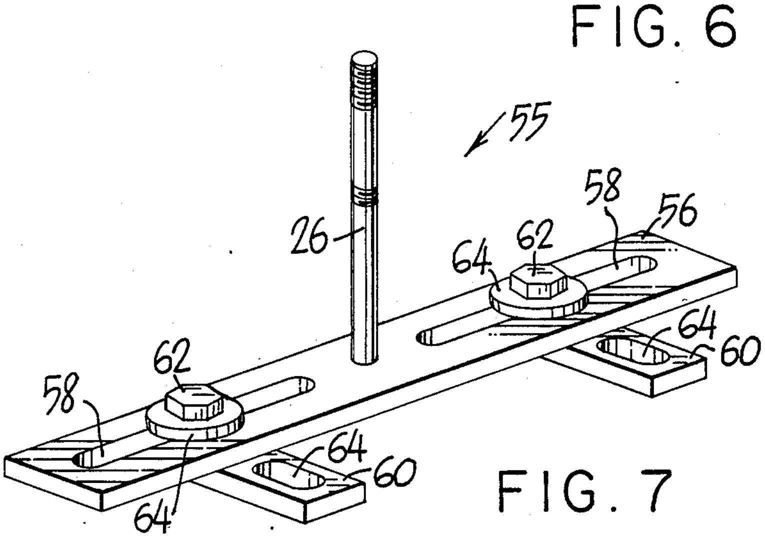
FIG. 7 is an alternative support leg assembly in accordance with the invention.

FIG. 7 illustrates an alternative embodiment of a support leg assembly, including a support rod 26, as in the embodiment described above. The support rod 26 connects to a plate 56 of extended length and having a pair of longitudinal slots 58 with their major axes parallel to the longitudinal axis of the plate 56. Mounting bases 60 are adjustably connected to the plate 56 by means of bolts 62 which extend through washers 64, and engage in threaded holes (not shown), respectively, in the bases 60. Each base 60 includes an elongated slot 64 having its major axis radially oriented with respect to the bolt 62. Thus, the bases 60 can be positioned anywhere along the lengthwise direction of the slots 58, and oriented in any direction relative to the rotational axis of the bolts 62 prior to tightening the bolt 62 so as to fix the position of the base 60.

When the wheel hub has its lugs positioned such that no two lugs are on a common diameter, the adapter 55 is used with the assembly of FIGS. 1–6 by removing one support leg assembly, for example, assembly 22, and replacing it with the adapter 55 by inserting the rod 26 of the adapter through the elongated slot 20, where the assembly 22 has been removed, and tightening the adapter in position by means of the nuts 34 and washers 32, 33 as described above. Then, the adapter wheel puller, now including the adapter 55, may be used on wheels where three lugs are positioned to form a triangle, such that when the three bases 28, 60 are positioned over lugs, the contact pad 42 is over the center of the wheel hub, that is, at the axle housing.

In an actual embodiment of an adapter 55, which operates with the components of FIGS. 1–6, the plate 56 is ½" thick steel, which is 14" long by 2½" wide. The slots 58 are ⅞" wide, 4½" long and begin ¾" from the end of the plate 56. A 49/64" hole is drilled in the center of the plate 56 and tapped with a ⅞" NC thread.

The bases 60 are ½" steel plate, 4" long by 2½" wide. A 49/64" hole having its center ¾" from one end of the base 60 is drilled and tapped with a ⅞" NC thread. The slots 58 are ¾" wide by 2" long. It should be noted that where the rods 26 are threaded into the bases 28, 60, a spot weld is used to prevent loosening of the assembly. The rod and base may be integral.

A five-stud Dayton hub provides an arrangement of lug nuts, such that three nuts in triangular formation may be used with the hub puller with adapter 55. In such instances the bases are mounted to point outwardly from the center. The hub is removed from the axle housing by tightening the threaded rod 38.

The hub puller in accordance with the invention, is extremely adaptable because the bases may be adjusted readily for varying distances from the center axis 44, the bases can be oriented in any direction about the longitudinal axes of the rods 26, and the distance of the bases 28, 60 from the support bracket 12 is also adjustable by turning the rods 26 in the nuts 34 prior to tightening.

This heavy duty automotive wheel hub puller is capable of removing most heavy duty truck, bus, and trailer wheel and hub as one assembly. In the few cases where mounting of the tool is difficult with the wheel in place, by removing the wheel first, the tool can be mounted directly to the hub without any problems. The wheel hub of this invention is of great help when working on vehicles whose hubs have not been removed for a long period of time, and whose bearings tend to cling to the axle housing. Because of the enormous, steady pressure that the subject wheel hub puller is capable of exerting against the wheel hub, it is a great aid when removing hubs which have suffered burnt bearings, as these bearings generally weld themselves to the axle housing.

Whereas a hex head knob 40 is shown on the threaded rod 38 for operating the device, it should be apparent that in alternative embodiments in accordance with the invention any means for rotating the rod 38 and applying adequate forces thereto will be acceptable.

Figure 4:
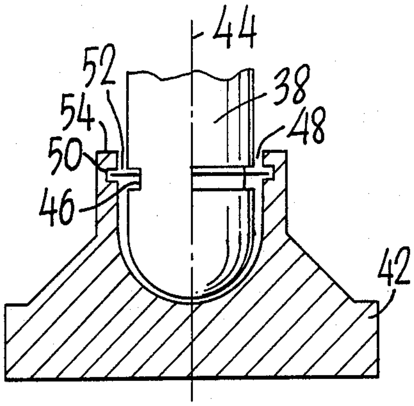
FIG. 4 is a partial sectional view of the pressure contact pad of the heavy duty automotive wheel hub puller of FIG. 1.
Figure 5:
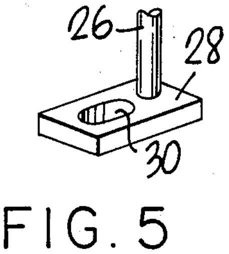
FIG. 5 is a perspective view of a leg/base portion of the heavy duty automotive wheel hub puller of FIG. 1.
Figure 6:
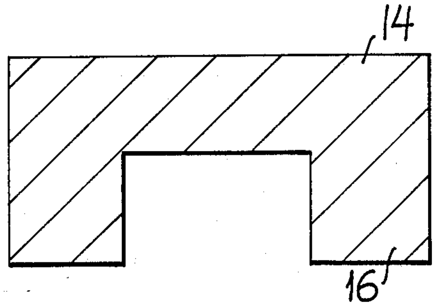
FIG. 6 is a sectional view taken along the line 6—6 of FIG. 2.

It should also be apparent that in an alternative embodiment, the connection between the bases 28, 60 and the rods 26 may allow for pivoting, for example, a connection as shown in FIG. 4. In such a construction, the rod 26 need not be rotatable within nuts 34 to enable positioning of the bases 28 and some type of clamping device to hold the rod at the desired position in slot 20 may be used in place of the arrangement discussed above and illustrated herein. Also the plates 15, 56 may be in part arcuate rather than flat to provide greater resistance to bending under load.

It will thus be seen that the objects set forth above, among those made apparent from the preceding description, are efficiently attained and, since certain changes may be made in above constructions without departing from the spirit and scope of the invention, it is intended that all matters contained in the above description or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A wheel hub puller, comprising an elongated bracket having a center portion;

at least first and second support rods extending at an angle to said bracket and each having a longitudinal axis;

means for adjustably positioning and fixing said support rods relative to said bracket at selected positions along the length of said bracket;

an intermediate plate;

at least first, second and third mounting bases, said first and second mounting bases being attached at one end of said first support rod through said intermediate plate, said first and second bases being connected at separate locations on said intermediate plate, said first rod being connected to said intermediate plate at a location between said first and second bases, said third base being attached at one end of said second support rod, means for adjustably positioning said third base relative to said longitudinal axis of said second support rod;

an elongated pressure screw having a free end and extending substantially parallel to said first and second support rods, said screw being positioned at said center portion of said bracket;

means for adjustably setting the distance of said free end of said pressure screw for said bracket.

2. A wheel hub puller as claimed in claim 1, wherein said means for adjustably setting the distance of said free end of said pressure screw, includes a threaded portion on said pressure screw and threads on said bracket at said center position, said pressure screw passing through said bracket and being threadably engaged therewith at said center portion.

3. A wheel hub puller as claimed in claim 1, wherein said mounting bases are adapted for connection to the lugs on an automotive wheel hub.

4. A wheel hub puller as claimed in claim 1, and further comprising a pressure pad connected at said free end to said pressure screw.

5. A wheel hub puller as claimed in claim 4, wherein said pressure pad is rotatably mounted to said pressure screw, said rotation being about the lengthwise axis of said screw.

6. A wheel hub puller as claimed in claim 1, further comprising means for adjustably positioning and fixing said first and second bases at selected positions along the length of said intermediate plate.

7. A wheel hub puller as claimed in claim 6, further comprising longitudinal slots in said intermediate plate, threaded bolts connected to said first and second bases, said bolts extending through said slots to engage said first and second bases, said position of said first and second bases relative to said longitudinal axis of said first rod being set concurrently when said bolts are tightened.

8. A wheel hub puller as claimed in claim 1, wherein said means for adjustably positioning said bases at selected rotational angles relative to said longitudinal axes, comprise means for adjustably rotating and positioning said rods about said rod axes respectively.

9. A wheel hub puller as claimed in claim 8, wherein said means for adjustable rotating and positioning said rods about said longitudinal rod axes are said threads with said nuts threadably engaged thereon, said rods being selectively rotatable within said nuts to a selected rotative position prior to tightening said nuts against said bracket, said positioning of said rods on said bracket and said rotational positioning of said third base on said second rod being effected simultaneously by tightening said nuts against said bracket.

10. A wheel hub puller as claimed in claim 9, wherein said mounting bases are adapted for connection to the lugs on an automotive wheel hub.

11. A wheel hub puller as claimed in claim 1, wherein said support rods are threaded at least in part, said means adjustably positioning and fixing said support rods relative to said bracket, including nuts threadably engaging said threaded portions of said rods, and for locking against said bracket to hold said support rods in said selected lengthwise positions.

12. A wheel hub puller as claimed in claim 11, wherein said bracket includes slots extending in a lengthwise direction of said bracket, said support rods extending through said slots.

13. A wheel hub puller as claimed in claim 12, wherein said nuts are positioned on both sides of said bracket, said nuts when tightened against said bracket from both sides, holding said rods in said lengthwise position.

14. A wheel hub puller as claimed in claim 13, wherein said means for adjustably positioning said bases include means for adjustably rotating and positioning said rods about said longitudinal rod axes.

* * * * *